United States Patent
Hyun et al.

(10) Patent No.: US 9,264,806 B2
(45) Date of Patent: Feb. 16, 2016

(54) APPARATUS AND METHOD FOR TRACKING LOCATIONS OF PLURALITY OF SOUND SOURCES

(71) Applicant: Samsung Electronics Co., Ltd., Suwon (KR)

(72) Inventors: Kyung Hak Hyun, Suwon (KR); Jin Sung Kim, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 510 days.

(21) Appl. No.: 13/665,143

(22) Filed: Oct. 31, 2012

(65) Prior Publication Data

US 2013/0108066 A1 May 2, 2013

(30) Foreign Application Priority Data

Nov. 1, 2011 (KR) .......................... 10-2011-0112998

(51) Int. Cl.
*H04R 3/00* (2006.01)
*G01S 3/808* (2006.01)

(52) U.S. Cl.
CPC .............. *H04R 3/005* (2013.01); *G01S 3/8083* (2013.01); *H04R 2201/403* (2013.01); *H04R 2430/23* (2013.01)

(58) Field of Classification Search
CPC ................................ H04R 3/005; H04R 1/406
USPC .............. 381/91–92, 122; 367/119–119, 124, 367/118–119
See application file for complete search history.

(56) References Cited

U.S. PATENT DOCUMENTS

| 8,891,785 | B2 * | 11/2014 | Sorensen | G01S 3/805 367/118 |
| 2006/0245601 | A1 | 11/2006 | Michaud et al. | |
| 2009/0279714 | A1 | 11/2009 | Kim et al. | |
| 2010/0142327 | A1 * | 6/2010 | Kepesi | G01S 3/786 367/124 |
| 2012/0140947 | A1 * | 6/2012 | Shin | 381/92 |

FOREIGN PATENT DOCUMENTS

WO 2010/048620 A1 4/2010

OTHER PUBLICATIONS

J.M Valin et al., "Localization of simultaneous moving sound sources for mobile robot using frequency-domain steered beamformer approach", Proceedings of the Apr. 2004 IEEE International Conference on Robotics and Automation.
European Search Report dated Dec. 18, 2013 in related European Patent Application 12190449.4.

* cited by examiner

*Primary Examiner* — Disler Paul
(74) *Attorney, Agent, or Firm* — Staas & Halsey LLP (57) ABSTRACT

Disclosed are an apparatus and a method for tracking locations of a plurality of sound sources. According to the apparatus and the method, a task for searching sound source candidates is repeated at respective predetermined frames of microphone signals to collect sound source candidates, and only the collected sound source candidates are verified through beamforming, thereby more rapidly and accurately tracking the plurality of sound sources in spite of using a small number of microphones.

8 Claims, 6 Drawing Sheets

APPARATUS AND METHOD FOR TRACKING LOCATIONS OF PLURALITY OF SOUND SOURCES

CROSS-REFERENCE TO RELATED APPLICATIONS

This application claims the benefit of Korean Patent Application No. P2011-0112998, filed on Nov. 1, 2011, in the Korean Intellectual Property Office, the disclosure of which is incorporated herein by reference.

BACKGROUND

1. Field

One or more embodiments of the present disclosure relate to an apparatus and a method for tracking locations of a plurality of sound sources. More specifically, one or more embodiments of the present disclosure relate to an apparatus and a method for tracking locations of a plurality of sound sources using a microphone array.

2. Description of the Related Art

In the field of voice techniques such as voice recognition, speaker recognition and video-telephony, recognition of the number of speakers or noise sources and the locations thereof is important for voice pre-treatment since voice amplification/reduction, or voice source separation is applied according to circumstances.

The method for tracking locations of sound sources is accomplished using differences in signals that reach a plurality of microphones disposed in a predetermined area.

However, methods of the related art require more microphones than the number of sound sources and have a limitation with respect to installment location of microphones.

Consequently, this limitation results in a loss in terms of product price or design when the method is applied to products. For this reason, there is a need for development of methods for tracking locations of a plurality of sound sources that are also applicable to a relatively small number of microphones.

SUMMARY

Therefore, it is one aspect of the present disclosure to provide an apparatus and a method for tracking locations of a plurality of sound sources, capable of rapidly and accurately tracking locations of the sound sources using a relatively small number of microphones.

Additional aspects of the disclosure will be set forth in part in the description which follows and, in part, will be obvious from the description, or may be learned by practice of the disclosure.

In accordance with one aspect of the present disclosure, provided is an apparatus for tracking locations of a plurality of sound sources including: a microphone array including a plurality of linearly disposed microphones; and a sound source tracker to extract sound source candidates at respective predetermined frames from microphone signals received from the microphone array, to verify the extracted sound source candidates through beamforming and to predict locations of actual sound sources using the verified result.

Each predetermined frame may have a data volume of the microphone signal of 256, 512 or 1024 bits.

The sound source tracker may include: a sound source candidate extractor to extract a plurality of sound source candidates at respective predetermined frames from microphone signals received from the microphone array; and a sound source candidate verifier to perform beamforming on the sound source candidates extracted by the sound source candidate extractor, to select the plurality of sound source candidates having a predetermined value or higher of signal intensity from the sound source candidates obtained as a result of beamforming and to predict locations of actual sound sources based on the selected sound source candidates.

The sound source candidate extractor may include: a sound source feature extractor to extract voice features required for tracking locations of sound sources at respective frames from microphone signals received from the microphone array; and a sound source candidate group extractor to extract the sound source candidates, based on the sound source features extracted by the sound source feature extractor, and to extract a plurality of sound source candidate groups, each including sound source candidates having the same sound source direction, from the extracted sound source candidates.

In accordance with another aspect of the present disclosure, provided is a method for controlling an apparatus for tracking locations of a plurality of sound sources including: a microphone array including a plurality of linearly disposed microphones; and a sound source tracker to recognize locations of the sound sources according to microphone signals received from the microphone array, the method including: receiving microphone signals from the microphone array; extracting sound source candidates at respective predetermined frames of the received microphone signals; beamforming the extracted sound source candidates; selecting sound source candidates having a predetermined value or higher of signal intensity using the beamformed result; and assuming locations of actual sound sources based on the selected sound source candidates.

During extraction of sound source candidates, each predetermined frame may have a data volume of the microphone signal of 256, 512 or 1024 bits.

The extraction of sound source candidates may include: extracting sound source features at respective predetermined frames of the received microphone signals; and extracting sound source candidates based on the respective extracted sound source features.

The extraction of sound source candidates may include: extracting sound source features at respective predetermined frames of the received microphone signals; extracting sound source candidates based on the extracted sound source features; and extracting a plurality of sound source candidate groups, each including sound source candidates having the same sound source direction, from the respective extracted sound source candidates.

According to the aspects of the present disclosure, a task for searching sound source candidates is repeated at respective predetermined frames of microphone signals to collect sound source candidates, and only the collected sound source candidates are verified through beamforming, thereby more rapidly and accurately tracking the plurality of sound sources in spite of using a small number of microphones.

In accordance with another aspect of the present disclosure, an apparatus for tracking locations of a plurality of sound sources is provided. The apparatus includes a microphone array comprising a plurality of linearly disposed microphones and a sound source tracker to extract sound source candidates at respective predetermined frames from microphone signals received from the microphone array, to verify the extracted sound source candidates through beamforming, to select sound source candidates exceeding a predetermined signal intensity from the verified sound source candidates obtained as a result of the beamforming, and to predict locations of actual sound sources using the selected sound source candidates exceeding the predetermined signal intensity.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described with reference to the accompanying drawings.

Figure 1:
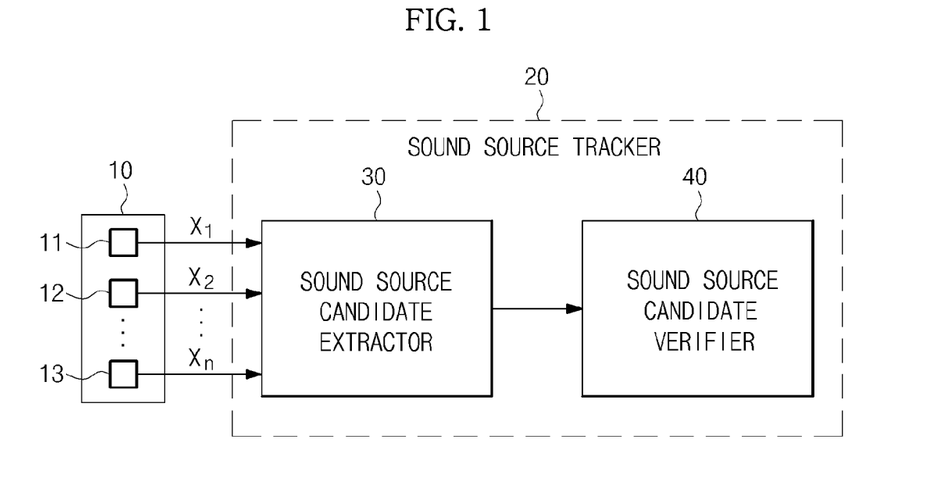
FIG. 1 is a view illustrating a configuration of an apparatus for tracking locations of a plurality of sound sources according to an embodiment of the present disclosure.

FIG. 1 is a view illustrating a configuration of an apparatus for tracking locations of a plurality of sound sources according to an embodiment of the present disclosure.

As shown in FIG. 1, the apparatus for tracking locations of a plurality of sound sources includes, for example, a microphone array 10 and a sound source tracker 20.

The microphone array 10 includes a plurality of microphones 11 with the microphones 11 being linearly spaced from each other by a predetermined distance and receiving sound source signals.

The sound source tracker 20 extracts sound source candidates at short-term sections from microphone signals (X1~Xm) received from the microphone array 10, verifies the extracted sound source candidates by way of beamforming, for example, and estimates the locations of actual sound sources using the verified result.

The sound source tracker 20 may include, for example, a sound source candidate extractor 30 and a sound source candidate verifier 40.

The sound source candidate extractor 30 extracts a plurality of sound source candidates.

The sound source candidate verifier 40 may perform beamforming on the plurality of sound source candidates extracted by the sound source candidate extractor 30. The sound source candidate verifier 40 may further select sound source candidates having a predetermined level or higher of signal intensity, among the plurality of sound source candidates, to verify respective sound source candidates and to predict locations of actual sound sources based on the verified sound source candidates.

Figure 2:
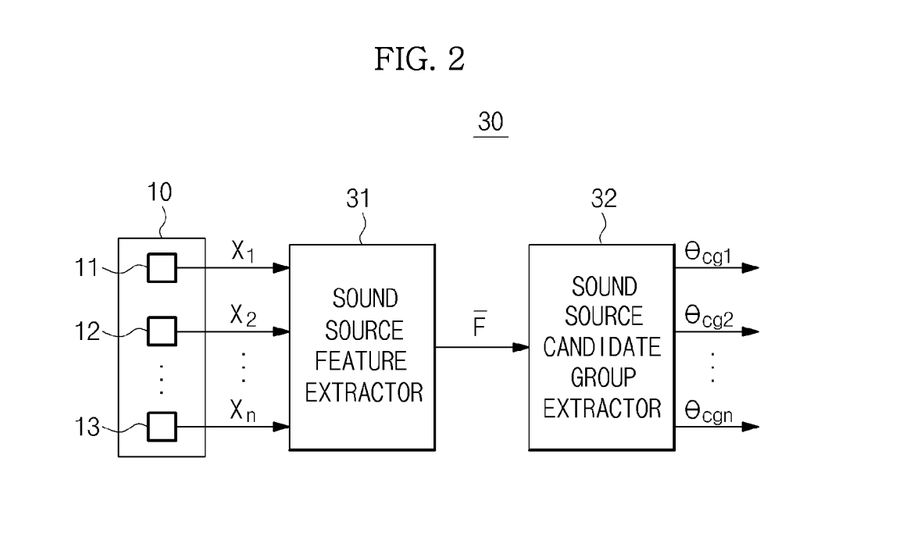
FIG. 2 is a block diagram illustrating a controlled configuration of a sound source candidate extractor of an apparatus for tracking locations of a plurality of sound sources according to an embodiment of the present disclosure.

FIG. 2 is a block diagram illustrating a controlled configuration of a sound source candidate extractor of an apparatus for tracking locations of a plurality of sound sources according to an embodiment of the present disclosure.

As shown in FIG. 2, the sound source candidate extractor 30 may include, for example, a sound source feature extractor 31 and a sound source candidate group extractor 32.

The sound source feature extractor 31 extracts voice features required for location tracking of sound sources from microphone signals received from the microphone array 10.

These sound source features are extracted through a predetermined algorithm. For example, generalized cross correlation phase transform (GCC-PHAT) commonly used for extraction of sound source features may be used. In general, in order to track locations of sound sources, two or more microphone signals present at different locations are required. The most general approach is to predict an angle using a difference in time at which signals arrive from respective microphones and microphone distance. However, it is difficult to calculate a time difference when sound sources are present at several locations. For this reason, a method for obtaining delay of signals using correlation between microphone signals is generally used. A variety of methods for obtaining this correlation are also divided, depending on normalization factors used. GCC-PHAT is a method for normalizing respective frequency intensities.

The sound source candidate group extractor 32 performs tasks for searching sound source candidates from sound source features from $\overline{F}$ extracted by the sound source feature extractor 31 according to respective predetermined short-term frames and extracts a sound source candidate group from the sound source candidates extracted according to the respective short-term frames. In this case, the same sound source candidates are grouped and classified into one sound source candidate group. The sound source candidate searched at least once at each frame is extracted into the corresponding sound source candidate group.

In this case, the predetermined short-term frames are signal sections in which the overall signal section has been divided according to a predetermined signal data size.

Figure 3:
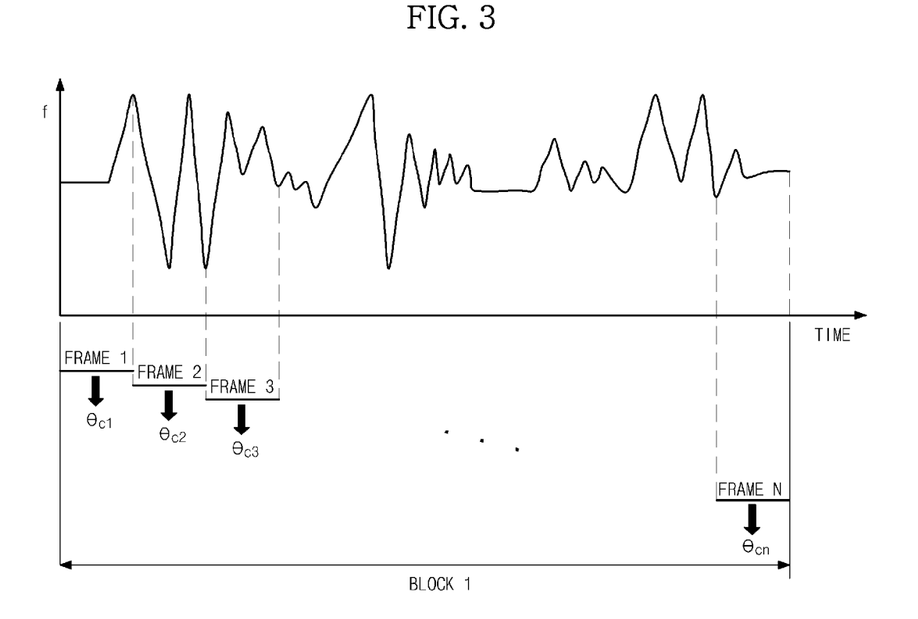
FIG. 3 is a view illustrating a process for searching azimuth candidates according to respective short-term frames in the sound source candidate extractor of the apparatus for tracking locations of sound sources according to an embodiment of the present disclosure.

FIG. 3 is a view illustrating a process for searching azimuth candidates according to respective short-term frames in the sound source candidate extractor of the apparatus for tracking locations of sound sources according to an embodiment of the present disclosure.

As shown in FIG. 3, the microphone signal section is divided into N frames.

One frame may be determined based on the volume of signal data. For example, the signal data may be 256, 512 or 1024 bits.

For example, one block of the microphone signal section includes 20 frames.

In respective frames, microphone signals are transformed into signals capable of extracting voice features through signal transformation such as windowing and fast fourier transform (FFT), voice features are extracted via an algorithm for voice feature extraction, and sound source candidates ($\Theta c1~\Theta cn$) are extracted, based on the extracted voice features. The sound source candidates ($\Theta c1~\Theta cn$) have a predetermined sound source candidate value in frames having sound source features, while the sound source candidates have a sound source candidate value of zero in frames having no sound source features. Such a sound source candidate having a predetermined sound source candidate value is an azimuth candidate, for example.

As such, by performing a task to extract sound source at respective frames, having relatively short time sections, it is possible to rapidly and accurately extract sound source candidates at every moment in areas in which there is a high probability of presence of sound sources. By extracting only one sound source having the highest probability of presence, as a candidate at each frame, it is possible to extract sound source candidates that are relatively resistant to spatial aliasing. For reference, it is necessary that a sound wave signal that arrives at the microphone array 10 from the sound source is sampled at least once per half wavelength of the highest frequency element of the corresponding signal, in order to accurately predict the direction of the corresponding sound source. For this reason, it is necessary that the distance between the microphones is shorter than the half wavelength of the highest frequency element of the corresponding sound source. When the distance between microphones is longer than a half wavelength, phase difference between signals that reach respective microphones in one direction is not accurately measured and is thus perceived as one sound that travels in several directions. This phenomenon is referred to as spatial aliasing.

Figure 4:
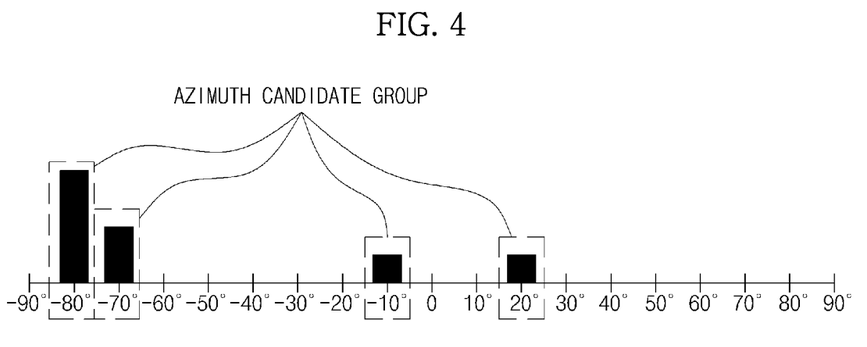
FIG. 4 is a view illustrating an operation for gathering azimuth candidates searched according to respective short-term frames and extracting an azimuth candidate group therefrom in a sound source candidate extractor in the apparatus for tracking locations of a plurality of sound sources according to an embodiment of the present disclosure.

FIG. 4 is a view illustrating a process for gathering azimuth candidates searched according to respective short-term frames and extracting an azimuth candidate group therefrom in a sound source candidate extractor in an apparatus for tracking locations of a plurality of sound sources according to an embodiment of the present disclosure.

As shown in FIG. 4, azimuth candidates, which are sound source candidates extracted at respective frames by the sound source candidate extractor 30, are grouped in such a manner that the number of extraction of the corresponding azimuths is increased in all azimuths that may be received, to constitute a sound source candidate group.

For example, in FIG. 4, four sound source candidate groups are present and the azimuths of sound source candidate groups are −80 degrees, −70 degrees, 10 degrees, and 20 degrees, respectively. The information of the sound source candidate groups (−80 degrees, −70 degrees, 10 degrees, 20 degrees) is transferred to the sound source candidate verifier 40. At this time, sound source candidates that are extracted at least once throughout the overall frames are considered to belong to the sound source candidate groups. That is, the sound source candidate group is a sound source candidate that is extracted at least once.

Figure 5:
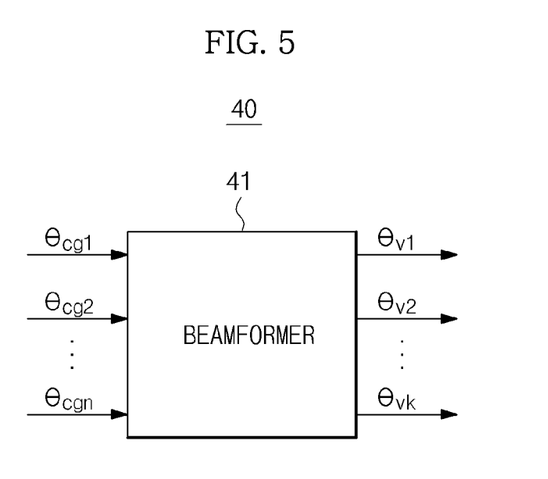
FIG. 5 is a block diagram illustrating a controlled configuration of a sound source candidate verifier in the apparatus for tracking locations of a plurality of sound sources according to an embodiment of the present disclosure.

FIG. 5 is a block diagram illustrating a controlled configuration of a sound source candidate verifier in an apparatus for tracking locations of a plurality of sound sources according to an embodiment of the present disclosure.

As shown in FIG. 5, the sound source candidate verifier 40 includes a beamformer 41.

The beamformer 41 performs beamforming of sound source candidate groups (Θcg1~Θcgn) extracted by the sound source candidate extractor 32, selects sound source candidate groups having a predetermined signal intensity or higher among the sound source candidate groups, and recognizes the sound source direction of the selected sound source candidate groups as locations of the actual sound sources. In this case, when the number of sound source candidate groups having a predetermined level or higher of sound source intensity is for example four during selection of sound source candidate groups, only several sound source candidate groups having a higher sound source intensity may be selected.

The beamformer 41 may perform beamforming at each block of signal sections.

Hereinafter, a general beamforming method executed by the beamformer 41 will be described.

The beamformer 41 receives sound source signals from a microphone array 10 in which M microphones 11 are disposed in a row.

The power of the beamformer 41 is defined as follows:

$$y(n) = \sum_{m=0}^{M-1} x_m(n - \tau_m) \quad (1)$$

wherein $x_m(n)$ is an $m^{th}$ microphone signal, $\tau_m$ is an $m^{th}$ delay of arrival (DOA) to a microphone.

The power energy E of the beamformer 41 at each microphone signal frame of a length L is as follows.

$$E = \sum_{n=0}^{L-1} [y(n)]^2 = \sum_{n=0}^{L-1} [x_0(n - \tau_0) + \ldots + x_{M-1}(n - \tau_{M-1})]^2 \quad (2)$$

In a case in which a sound source is present in one direction, delay of a signal that arrives at each microphone in one direction is $\tau_m$, when value is corrected in accordance with equation 2, the energy E of the beamformer 41 has a maximum value. Equation 3 is summarized according to respective microphone pairs as follows:

$$E = \sum_{m=0}^{M-1} \sum_{n=0}^{L-1} x_m^2(n - \tau_m) + 2\sum_{i=0}^{M-1} \sum_{j=0}^{i-1} \sum_{n=0}^{L-1} x_i(n - \tau_i)x_j(n - \tau_j) \quad (3)$$

The first term of Equation 3 is a sum of auto-correlations of respective microphone signals, is considered to be an invariable value and is neglected, since it has a substantially constant value with respect to a plurality of $\tau_m$. The second term is represented by correlation between an $i^{th}$ microphone and a $j^{th}$ microphone that are different from each other. When the foremost character "2" of the second term is neglected, the energy (E) of the beamformer 41 is proportional to a sum of correlations between different microphone signals.

$$E \propto \sum_{i=0}^{M-1} \sum_{j=0}^{i-1} R_{x_i x_j}(\tau) \quad (4)$$

wherein $\tau$ is $\tau_i$-$\tau_j$, a relative delay between an $i^{th}$ microphone and a $j^{th}$ microphone, which means that cross-correlations become a delay function between microphone signals, based on the assumption that the microphone signal is a wide-sense stationary (WSS). The correlation in the frequency region is represented by the following approximate value.

$$R_{x_i x_j}(\tau) \approx \sum_{k=0}^{L-1} X_i(k) X_j^*(k) e^{(\sqrt{-1})2\pi k \tau/L} \quad (5)$$

wherein $X_i(k)$ is a discrete fourier transform (DFT) of $x_i(n)$, $i^{th}$ microphone signal, $X_i(k)X_j^*(k)$ is a cross-spectrum of $x_i(n)$ and $x_j(n)$, and $(\circ)^*$ indicates a complex conjugate. K is a frequency index of DFT, and L is a frame length of each microphone signal and a DFT size.

However, when Equation 5 is used, correlation peaks are not sharp and all frequency components are evenly applied. Accordingly, specific frequency components, most of which are surrounding sounds rather than an object to be tracked also contribute to correlation output, making detection of a sound source having a narrow bandwidth such as voice slight difficult.

Accordingly, whitening is accomplished by normalization using an absolute value of each DFT and spectral weighting in which a higher weight is imparted to a spectrum having a high signal-to-noise ratio (SNR) is used.

$$\hat{R}_{x_i x_j}(\tau) = \sum_{k=0}^{L-1} \frac{w^2(k) X_i(k) X_j^*(k)}{|X_i(k)||X_j(k)|} e^{(\sqrt{-1})2\pi k \tau / L} \qquad (6)$$

wherein the weight w(k) at each frequency is obtained, based on Y(k), an average of power spectral densities of the total microphone signals calculated at the present time, and YN(k), an average of the power spectral densities Y(k) obtained at the last time, as follows:

$$w(k) = \begin{cases} 1, & Y(k) \leq Y_N(k) \\ \left(\frac{Y(k)}{Y_N(k)}\right)^\beta, & Y(k) > Y_N(k) \end{cases} \qquad (7)$$

wherein β(0<β<1) is weighted on the frequency element having a higher value than an average spectrum of the previous signal.

The average of $X_i(k)X_j^*(k)$ obtained for a predetermined time period (for example, 200 msec) is applied to Equation 6 to obtain correlation of respective microphone pairs.

Since M*(M−1)/2 different microphone pairs are present in the microphone array 10 including M microphones, M*(M−1)/2 correlations are calculated and applied to Equation 4 to obtain a beamformer energy E.

The energy E of the beamformer 21 thus obtained is a function of a delay difference between respective microphone pairs, and the delay difference, $\tau_{ij}$, between the $i^{th}$ microphone and the $j^{th}$ microphone, is expressed by a distance $d_{ij}$ between the corresponding microphone pairs and a direction $\theta_s$ of the sound source in M microphone arrays 10 as follows.

$$\tau_{ij} = \frac{d_{ij}\sin(\theta_s)}{c} \qquad (8)$$

wherein c is a velocity of sound. When a sampling frequency $f_s$ of the beamformer 41 and a microphone distance d are set, the number $N_d$ of directions in which a first beamformer 21 tracks is predicted in accordance with the following equation.

$$N_d \approx 1 + \frac{2d}{c} f_s \qquad (9)$$

When beamforming is performed using the microphone array 10, a tracking direction range is limited to a range between −90° and 90° under the assumption that the front direction is 0°, and an angular resolution of the beamformer 41 is obtained by dividing 180° by $N_d$. A delay difference between respective microphone pairs in $N_d$ directions is obtained in accordance with Equation 8 and is applied to the calculated correlation Equation 6, and the energy E of the beamformer 41 in each of $N_d$ directions is obtained in accordance with Equation 4. Among these, the direction having the highest energy E is determined to be a sound source direction at every time cycle.

When a plurality of sound sources are simultaneously tracked, like tracking of one sound source, an energy E of the beamformer 41 is obtained while scanning all directions. However, scanning is performed in other directions excluding the searched direction of sound source and a direction having the highest energy E among the directions is determined to be a direction of the next sound source.

Figure 6:
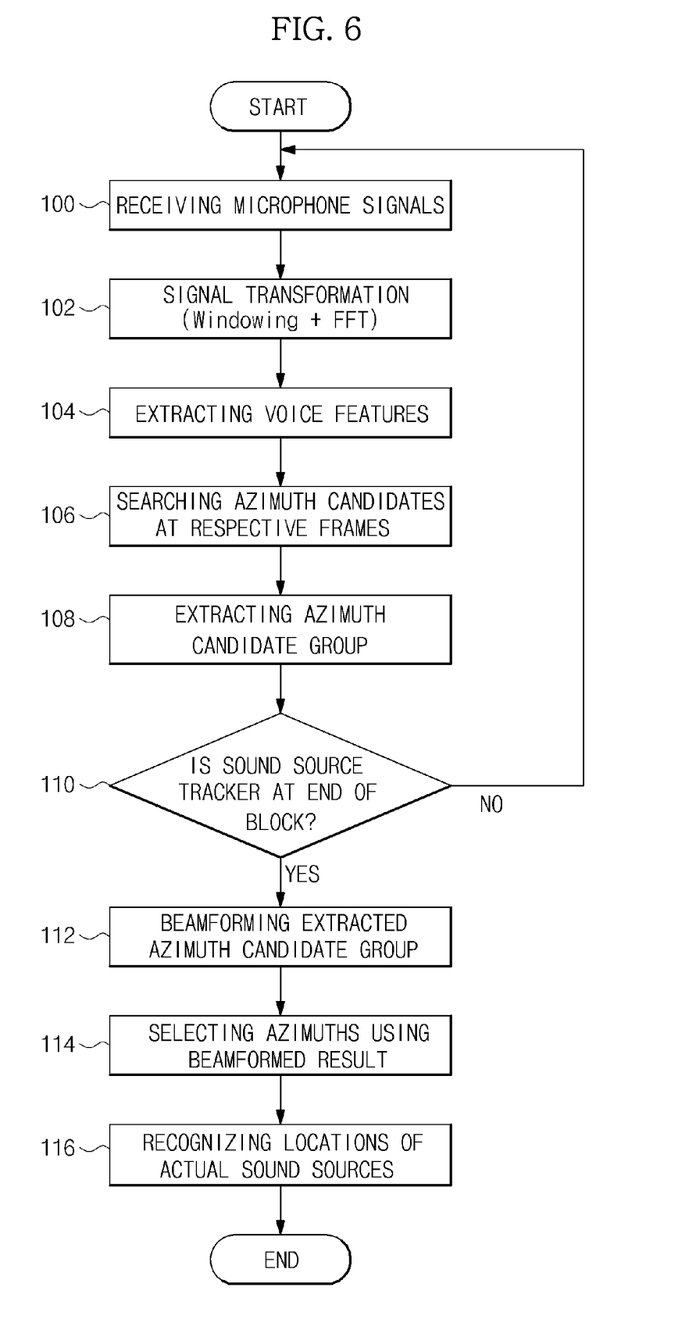
FIG. 6 is a flowchart illustrating a controlled configuration of the apparatus for tracking locations of a plurality of sound sources according to an embodiment of the present disclosure.

FIG. 6 is a flowchart illustrating a controlled configuration of an apparatus for tracking locations of a plurality of sound sources according to an embodiment of the present disclosure.

Referring to FIG. 6, in operation 100, a sound source tracker 20 receives a microphone signal.

In operation 102, the sound source tracker 20 converts the received microphone signal into signals capable of extracting voice features through windowing and FFT.

In operation 104, the sound source tracker 20 extracts the voice feature.

In operation 106, the sound source tracker 20 searches for an azimuth candidate at each frame of the microphone signals.

In operation 108, the sound source tracker 20 extracts an azimuth candidate group.

In operation 110, the sound source tracker 20 determines whether the extraction is finished in all frames and it is determined whether the sound source tracker 20 is present at an end of the block.

When the sound source tracker 20 is not present at an end of the block, the sound source tracker 20 returns to operation 100.

Otherwise, when the sound source candidate extraction task is finished in all frames and the sound source tracker 20 is present at an end of the block, the sound source tracker 20 performs beamforming on the extracted azimuth candidate group in operation 112.

In operation 114, the sound source tracker 20 selects an azimuth using the beamforming result. At this time, among the azimuth candidate groups, an azimuth candidate group having a predetermined value or higher of signal intensity is selected.

In operation 116, the sound source tracker 20 recognizes a location of actual sound source, based on the selected azimuth candidates.

The method(s) according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the apparatus for tracking locations of a plurality of sound sources described herein.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An apparatus for tracking locations of a plurality of sound sources, the apparatus comprising:
    a microphone array comprising a plurality of linearly disposed microphones; and
    a sound source candidate extractor, comprising a processor, to extract sound source candidates at respective predetermined frames from microphone signals received from the microphone array; and
    a sound source candidate verifier to perform beamforminq on the sound source candidates extracted by the sound source candidate extractor, to select the plurality of sound source candidates having a predetermined value or higher of signal intensity from the sound source candidates obtained as a result of the beamforminq and to predict locations of actual sound sources based on the selected sound source candidates,
    wherein the sound source candidate extractor comprises:
    a sound source feature extractor to extract voice features required for tracking locations of sound sources at respective frames from microphone signals received from the microphone array; and
    a sound source candidate group extractor to extract the sound source candidates, based on the sound source features extracted by the sound source feature extractor, and to extract a plurality of sound source candidate groups, each including sound source candidates having the same sound source direction, from the extracted sound source candidates.

2. The apparatus according to claim 1, wherein each predetermined frame has a data volume of the microphone signal of 256, 512 or 1024 bits.

3. The apparatus according to claim 1, wherein the sound source candidate extractor transforms the microphone signals through windowing and a fast fourier transform (FFT), extracts voice features via a predetermined algorithm, and extracts the plurality of sound source candidates based on the extracted voice features, wherein sound source candidates in frames having sound source features are assigned a predetermined sound source candidate value other than zero, while sound source candidates in frames having no sound source features are assigned a sound source candidate value of zero, and only the sound source candidates having the sound source candidate value are extracted as candidates at each frame.

4. A method for predicting locations of a plurality of sound sources, the method comprising:
    receiving microphone signals from a microphone array comprising a plurality of linearly disposed microphones;
    extracting sound source candidates at respective predetermined frames of the received microphone signals;
    beamforming the extracted sound source candidates;
    selecting sound source candidates having a predetermined value or higher of signal intensity using results of the beamforming; and
    predicting locations of actual sound sources based on the selected sound source candidates,
    wherein the extracting of sound source candidates comprises:
    extracting sound source features at respective predetermined frames of the received microphone signals;
    extracting sound source candidates based on the extracted sound source features; and
    extracting a plurality of sound source candidate groups, each including sound source candidates having the same sound source direction, from the respective extracted sound source candidates.

5. The method according to claim 4, wherein, during extraction of sound source candidates, each predetermined frame has a data volume of the microphone signal of 256, 512 or 1024 bits.

6. The method according to claim 4, wherein the extracting sound source features at respective predetermined frames of the received microphone signals further comprises:
    transforming the microphone signals through windowing and a fast fourier transform (FFT);
    extracting voice features via a predetermined algorithm; and
    extracting sound source candidates based on the extracted voice features, wherein sound source candidates in frames having sound source features are assigned a predetermined sound source candidate value other than zero, while sound source candidates in frames having no sound source features are assigned a sound source candidate value of zero, and only sound source candidates having the sound source candidate value are extracted as candidates at each frame.

7. The method according to claim 4, wherein in the selecting of the sound source candidates further comprises:
    selecting sound source candidates exceeding a predetermined signal intensity from the verified sound source candidates obtained as a result of the beamforming; and
    predicting locations of actual sound sources based on the selected sound source candidates.

8. At least one non-transitory medium comprising computer readable code to control at least one processor to implement the method of claim 4.

* * * * *